United States Patent [19]

Stewart

[11] Patent Number: 4,487,314

[45] Date of Patent: Dec. 11, 1984

[54] TIRE CHAIN CONTAINER APPARATUS

[75] Inventor: Robert T. Stewart, Redmond, Wash.

[73] Assignee: Wink Corporation, Lynnwood, Wash.

[21] Appl. No.: 460,262

[22] Filed: Jan. 24, 1983

[51] Int. Cl.³ .............................................. A44B 7/00
[52] U.S. Cl. ................................... 206/216; 206/335; 206/348; 152/213 R; 248/346; 81/15.8
[58] Field of Search ............... 206/335, 348, 560, 564, 206/216; 248/346; 152/213 R; 81/15.8

[56] References Cited

U.S. PATENT DOCUMENTS

| | | | |
|---|---|---|---|
| 2,604,802 | 7/1952 | Rhoads et al. | 81/15.8 |
| 3,893,500 | 7/1975 | Planz | 81/15.8 |
| 4,103,870 | 8/1978 | Murakami | 81/15.8 |
| 4,249,657 | 2/1981 | Bates | 206/335 |

Primary Examiner—Joseph Man-Fu Moy
Attorney, Agent, or Firm—Robert J. Schaap

[57] ABSTRACT

A tire chain container apparatus which is comprised of a bottom casing or bottom having an internal storage area for receiving tire chains and which is designed so that it can stand in an upright position. A cover for the casing is formed substantially of a molded plastic material and is adapted to be used as a mounting member for installing a tire chain around a vehicle wheel tire. The container cover is provided with a pair of ramps leading to a somewhat dished or concave upward surface and is provided with a recess in the upper surface to receive a portion of the tire chain. The cover is formed so that it is not only light in weight, but includes internal ribs in order to reinforce the same and structurally accommodate the weight of the vehicle carried by that wheel and tire and supported by the cover. Carrying handles are mounted on the casing for carrying the apparatus and which handles are adapted to hold the cover in place and displaceable to permit removal of the cover.

37 Claims, 12 Drawing Figures

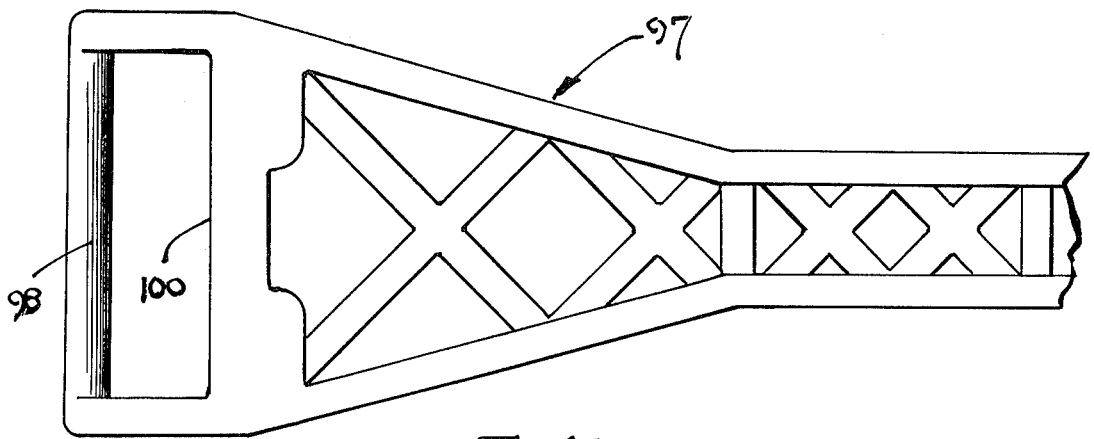
FIG. 10
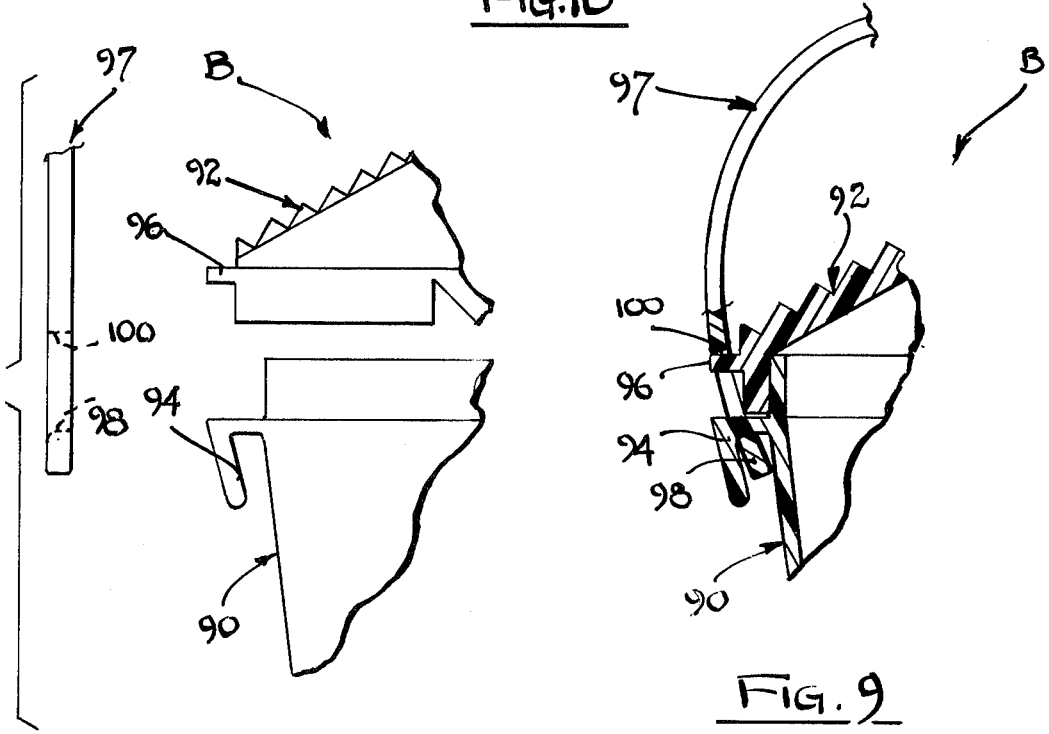
FIG. 9
FIG. 8

TIRE CHAIN CONTAINER APPARATUS

BACKGROUND OF THE INVENTION

1. Field of the Invention

This invention relates in general to certain new and useful improvements in tire chain container apparatus, and more particularly, to a tire chain container apparatus having a container for storage of tire chains and a cover for the container which is also adapted to support the weight of a vehicle wheel thereon and aid in the application of a tire chain to that vehicle wheel.

2. Brief Description of the Prior Art

There have been many proposed ramp devices for aiding in the application of a tire chain to a vehicle wheel and tire. These ramp devices usually include a pair of inclined walls leading to a somewhat dished or concave upper surface to support the tire on a vehicle wheel. A groove or recess in this upper surface receives a portion of the tire chain and enables the tire chain to be fastened to the wheel and tire of the vehicle.

One such device is more fully taught and illustrated in U.S. Pat. No. 3,937,263 to Hill et al. This device includes a pair of ramp devices in the form of hollow shells. When the two ramp devices are assembled together, the tire chains can be stored in an interior compartment formed in and by the two shells. However, this device is not really effective, neither as a support for a vehicle wheel nor as a container for tire chains. In the device of the Hill et al Patent, each of the shells is not designed to support that portion of the weight of a conventional present day automotive vehicle carried by one of wheels of that vehicle.

The device of the Hill et al Patent also is not adapted to stand in an upright position. Due to the fact that each of the shell halves dose not include the proper internal supporting struts or ribs, each shell must be formed of unduly thick walls, even when formed of a metal, to support the weight of a portion of a vehicle carried by one of the wheels. Further, each shell is formed in such manner, that there is serious doubt if the device can support that portion of the weight of a four-wheeled vehicle carried by one of the wheels when made of any non-ferous material. Thus, the device itself is fairly heavy and due to the size, shape and weight, it is difficult to move and manipulate. This device would also be quite noisy if formed of a metal when the tires chains are stored between the two shell halves since the chains would rattle against the walls of the cavity formed by the two shell halves.

Similar types of tire chain supporting devices are taught in U.S. Pat. No. 4,103,870 to Murakami, U.S. Pat. No. 1,189,632 to Seitz, U.S. Pat. No. 4,031,939 to DeMartina and Canadian Pat. No. 457,758 to Oliver. These other prior art devices similarly do not include properly designed containers in order to store the tire chains when not in use. Further, in almost all cases, they must be formed of a metal and of sufficient thickness in order to support the weight of a vehicle carried by one vehicle wheel and tire since these prior art devices are not internally supported with the necessary struts or ribs.

In addition to the above described problems, these prior art devices do not provide means for holding the device in a fixed position on the ground surface to enable a vehicle wheel and tire to be driven onto the upper surface of the device without movement of the device. Thus, one must carefully wedge the forward portion of these devices in order to prevent movement thereof and to enable the driving of the tire onto the upper surface of these devices.

OBJECTS OF THE INVENTION

It is, therefore, a primary object of the present invention to provide a tire chain container apparatus including a container casing for storing of the chains when not in use and a cover which is also adapted as a ramp device for permitting a vehicle wheel to be driven thereon to aid in the application of a tire chain to that vehicle wheel.

It is another object of the present invention to provide a tire chain container apparatus of the type stated in which the container cover is light in weight and internally reinforced with struts or ribs to support that portion of the weight of the vehicle carried by the vehicle wheel when on the cover.

It is a further object of the present invention to provide a tire chain container apparatus of the type stated which may be formed of injected molded plastic material and which is thereby light in weight and yet sturdy in construction and capable of performing the intended functions:

It is also another object of the present invention to provide a tire chain container apparatus of the type stated in which the container cover is provided with means for engaging the ground surface when in use to prevent sliding thereof when a vehicle wheel is driven onto the upper surface of the cover.

It is another salient object of the present invention to provide a tire chain container apparatus of the type stated in which displaceable handles are used to carry the device and also to retain the cover on the storage casing without the need of other locking-type fasteners.

With the above and other objects in view, my invention resides in the novel features of form, construction, arrangement and combination of parts presently described and pointed out in the claims.

BRIEF SUMMARY OF THE DISCLOSURE

A tire chain container apparatus having a bottom casing formed of a plastic material and having a continuous enclosing side wall and a bottom wall forming an interior chamber with an open upper end. The interior chamber is sized to receive tire chains for the wheels of a vehicle.

In a preferred embodiment of the present invention, the bottom casing is rectangular in shape and has a rectangularly shaped side wall and bottom wall. The length and width of the casing is sufficient to support the casing in an upright position when the tire chains are stored therein. This feature is important in that the rectangular shape and flat bottom wall aid in preventing the chains from rattling about and knocking against container casing side wall during movement of the vehicle.

A cover, also formed of a molded plastic material, is adapted for removable disposition over the open upper end of the casing. The cover is provided with a dish-shaped or concave upper wall having a surface capable of receiving a vehicle wheel with a tire thereon and which cover is adapted to support the weight of the vehicle carried by that wheel and tire. A pair of opposed wheel receiving ramps are formed on the cover and lead to the upper surface thereof. A pair of side walls extend between and connect the ramps and the upper wall of the cover.

The upper surface of the cover is provided with a recess, such as a transversely extending recess therein to receive a portion of a tire chain. In this way, when a vehicle wheel is driven onto the upper surface of the cover, the portion of the chain in the recess can be brought into engagement with the underside of the wheel and tire and can be fastened around a portion of the tire on the vehicle wheel.

In one embodiment of the invention, the cover is provided with an interior region having a plurality of longitudinally extending struts or ribs which are integral with the cover and extend from each of the ramps to a center section. The cover is also provided with a plurality of transversely extending struts or ribs which are integral with the cover and extend between each of the side walls and are connected thereto. In this way, the cover is reinforced to enable it to support that portion of the vehicle carried by the vehicle wheel and tire.

The cover is provided on its underside in the interior region with a strut or rib extending completely around the recessed portion. The intersections of longitudinally extending ribs and the transversely extending ribs also preferably form slightly enlarged vertically supporting columns at their intersections. In a preferred embodiment, the cover is comprises of three interiorly located longitudinally extending struts or ribs and four transversely extending interiorly located struts or ribs. The lower ends of the ramps also provide two additional transverse struts and the lower ends of the walls provide two additional longitudinal struts in a more preferred embodiment.

Due to the fact that the cover itself is internally supported with its own ribs and struts, it may be molded in a unitary operation from a suitable plastic material. As a result, it is not only light in weight, but very durable in its construction and does not enable the creation of noise which would be encountered with chains banging against a metal container. In addition, the container can be constructed as a single molding operation, such as injection molding. As a result the apparatus can be produced at a relatively low cost. Further, the components can be easily colored as desired.

In still another embodiment of the tire chain container apparatus, a plurality of non-skid teeth are located on the lower edge of the cover. These teeth are adapted to engage the ground surface and thereby retentively hold the cover in a fixed position on such ground surface when a vehicle wheel is driven onto or off of the cover. This avoids the need of someone wedging the cover while the vehicle wheel is being driven onto or off of the cover and which wedging activity can be dangerous to someone trying to retain the cover in place.

In still another embodiment of the invention, a pair of outwardly projecting mounting elements are located on the wall of the casing and the mounting elements retain a handle member. When the handle member is in place and disposed over the cover to permit carrying of same, the handle member retentively holds the cover on the casing. The handle member is also displaceable so it is not over the cover member thereby permitting the latter to be removed. In this way, the handles can retentively hold the cover onto the casing and this avoids the need of other types of snaps or external fasteners.

In one embodiment, a pair of opposed handle members are mounted on the casing. These handle members are displaced by being pivotally mounted in such manner that they can be swung outwardly of the container permitting easy removal of the cover from the container casing. In like manner, they can be shifted upwardly to a position where they extend above portions of the ramps and the upper surface. In this embodiment, the handles are fixedly mounted and not removable from the container casing.

In another embodiment of the invention, the handles may be snap fitted onto mounting elements or hooks located on the side wall of the casing. Thus, for carrying the container apparatus, the handles can be snap fitted into place, and for permitting removal of the cover member, they can be easily disconnected from the side wall of the container.

This invention possesses many other advantages and has other purposes which may be made more clearly apparent from a consideration of the forms in which it may be embodied. These forms are shown in the drawings forming part of and accompanying the present specification. They will now be described in detail for the purposes of illustrating the general principles of the invention, but it is to be understood that such detailed descriptions are not to be taken in a limiting sense.

BRIEF DESCRIPTION OF THE DRAWINGS

Figure 1:
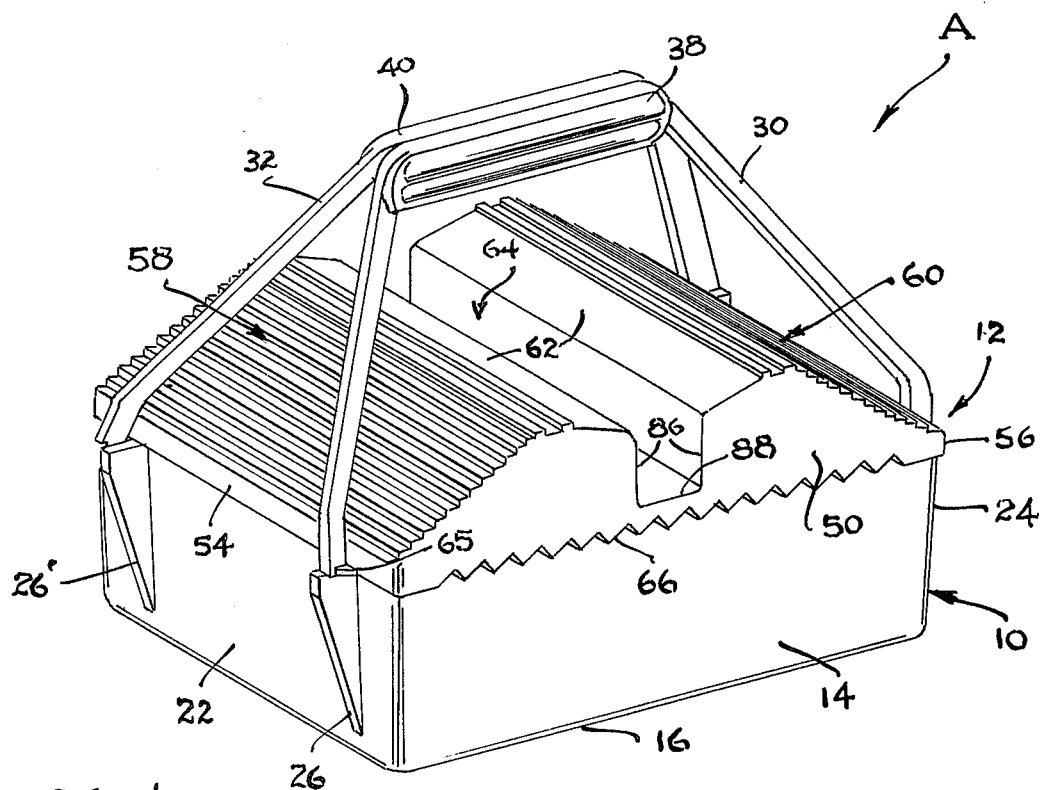
Figure 7:
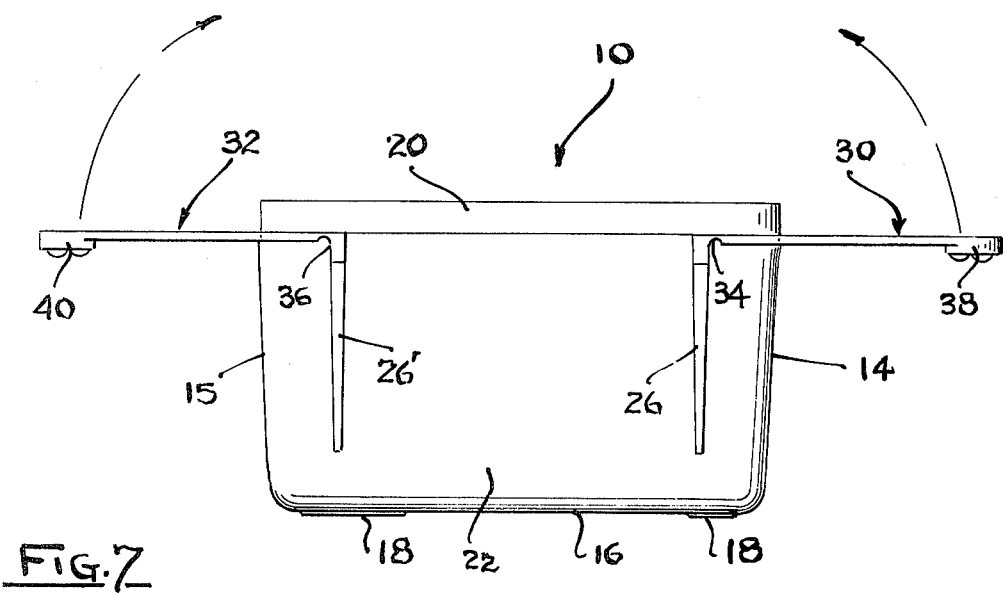
Figure 11:
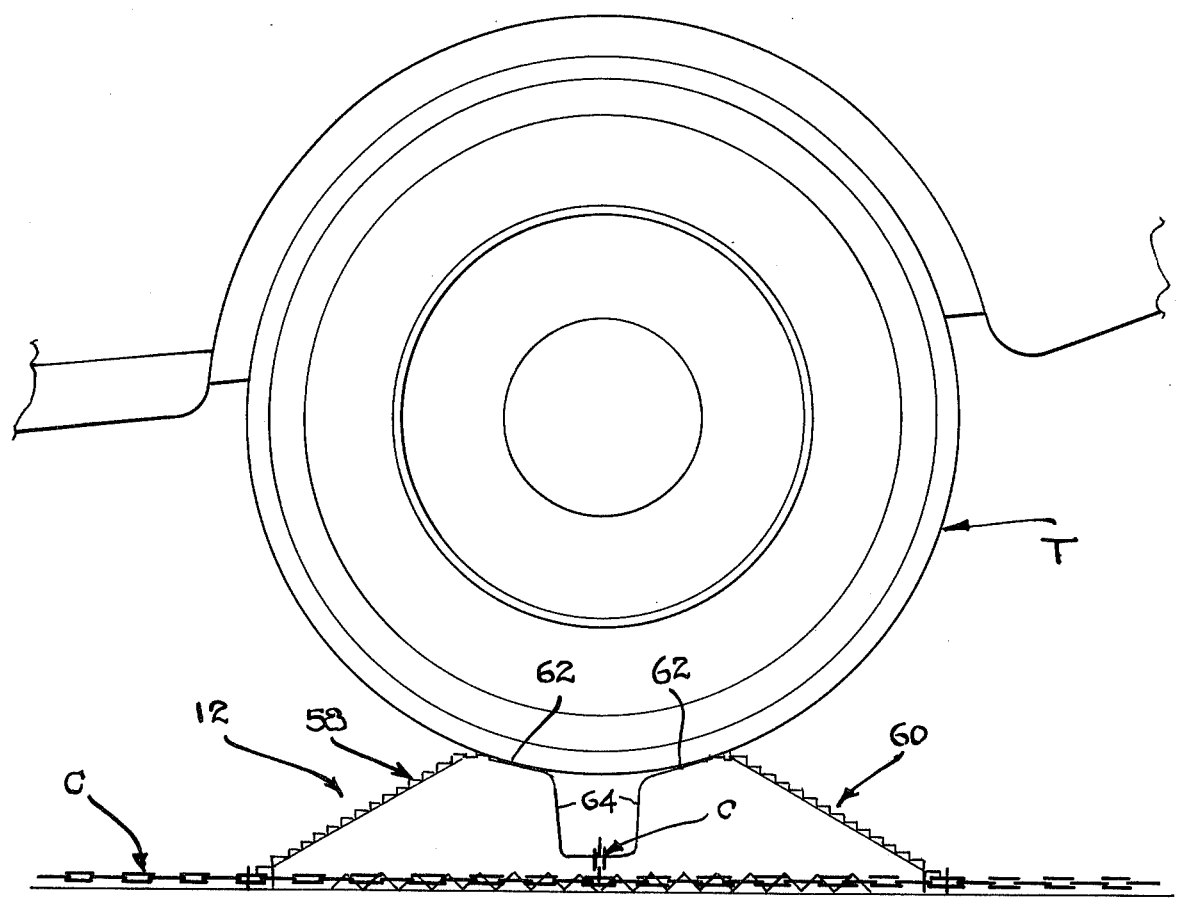
Figure 12:
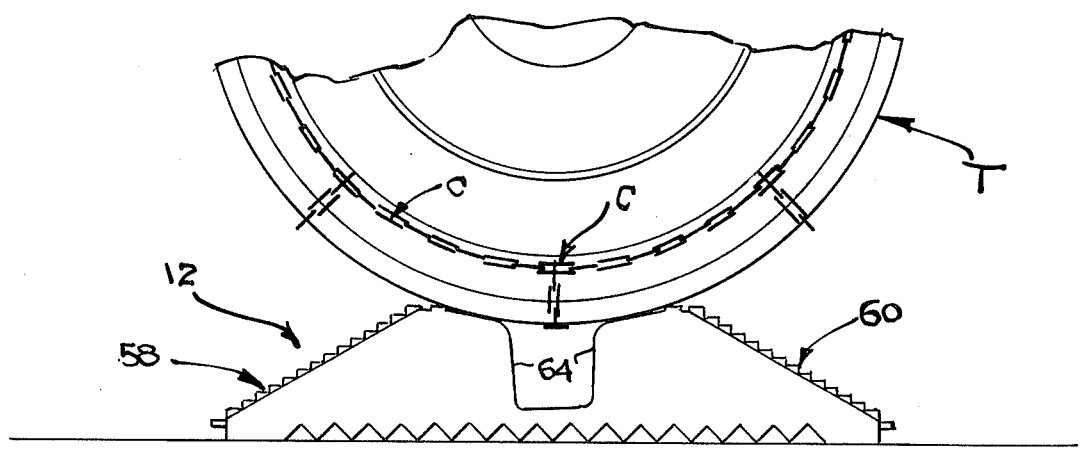
Figure 5:
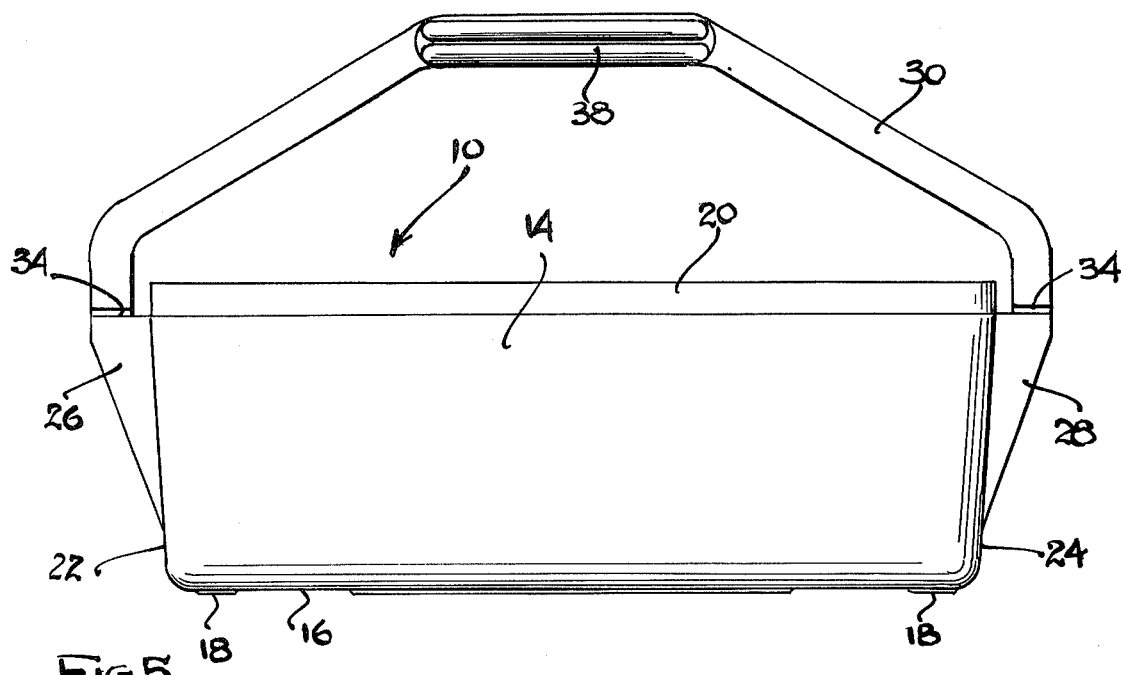
Figure 6:
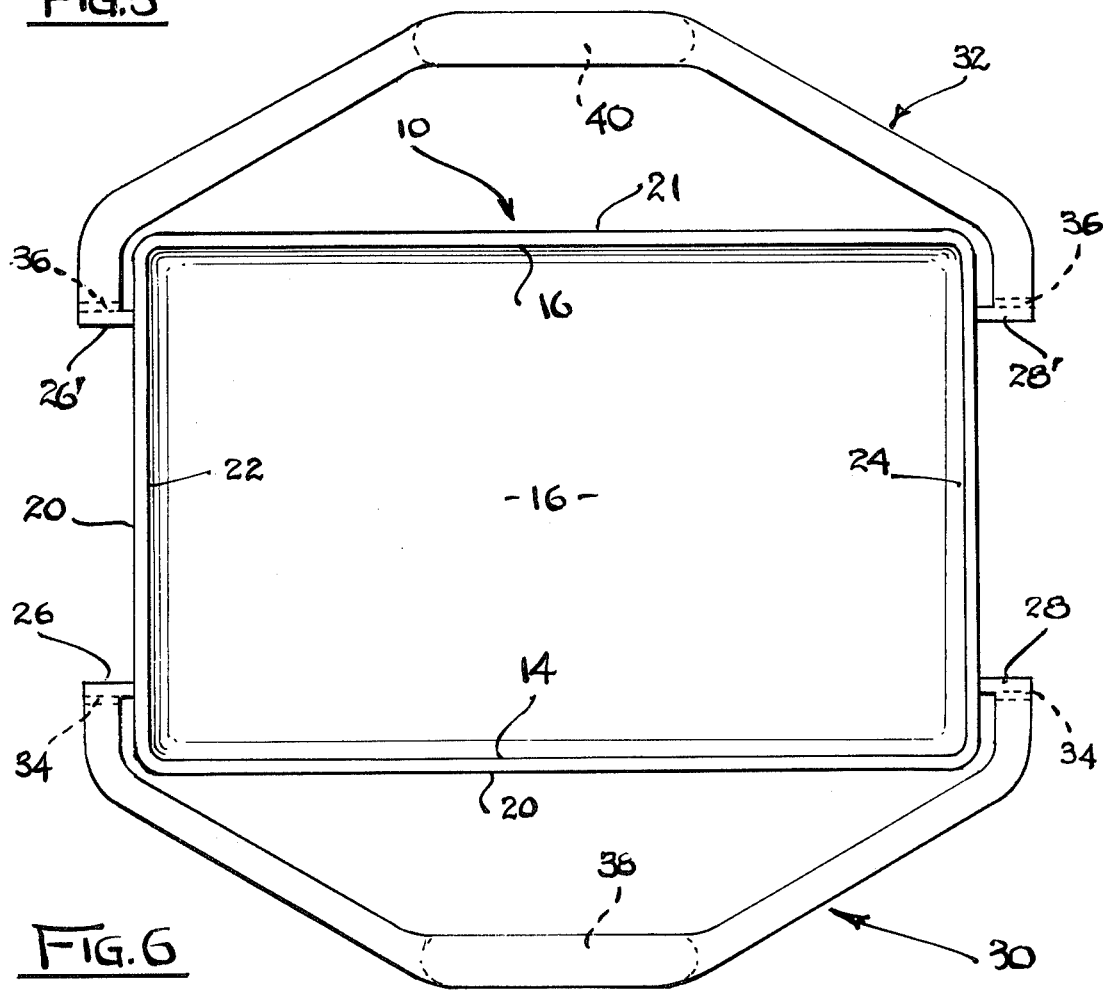
Figure 3:
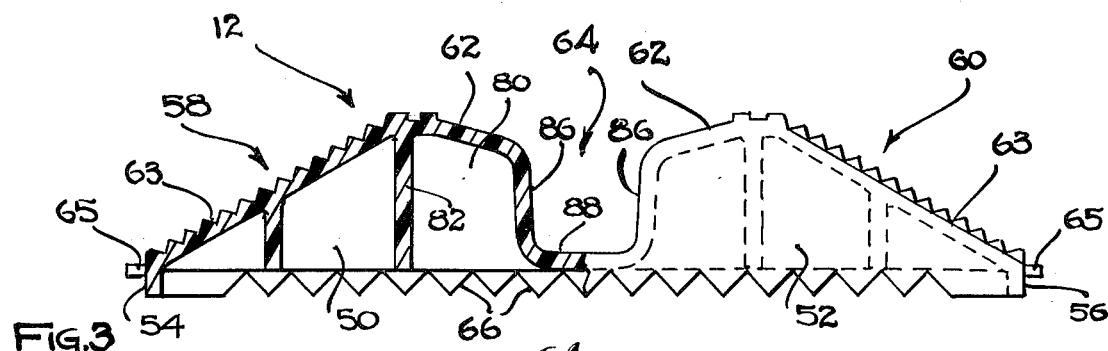
Figure 2:
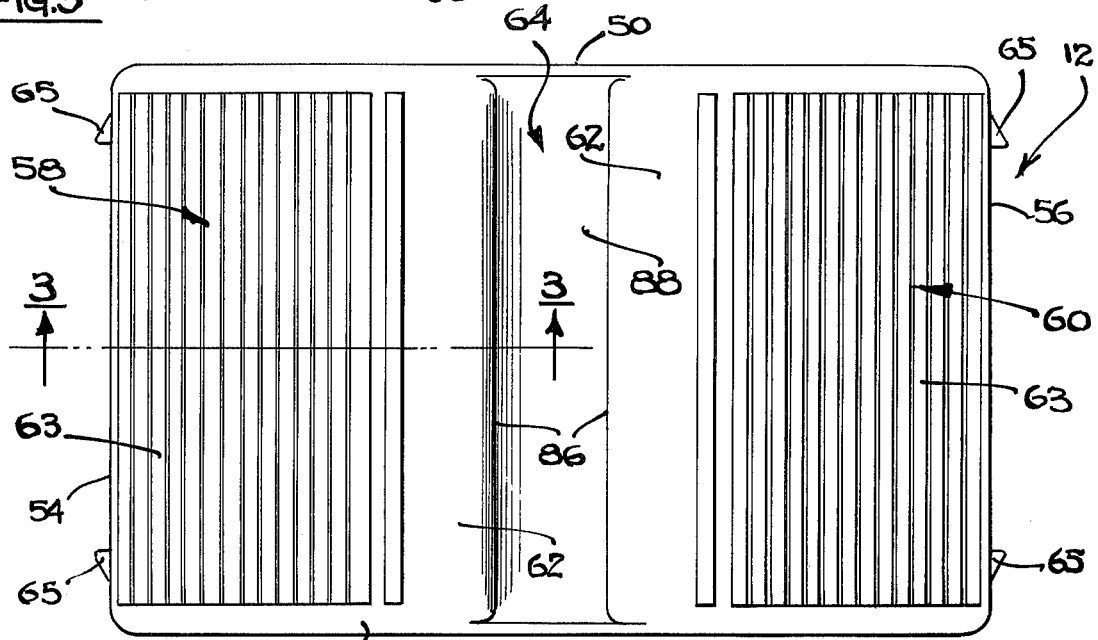
Figure 4:
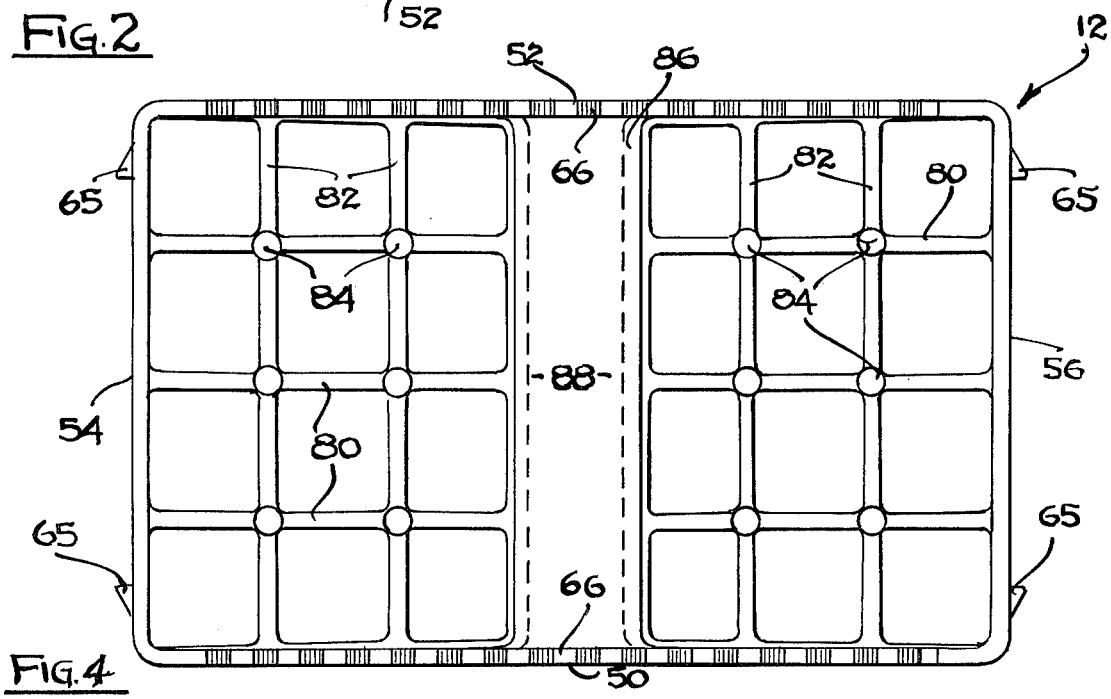

Having thus described the invention in general terms, reference will now be made to the accompanying drawings in which:

FIG. 1 is a perspective view of a tire chain container apparatus constructed in accordance with and embodying the present invention;

FIG. 2 is a top plan view showing the cover of the container apparatus used as a ramp for supporting a vehicle wheel thereon;

FIG. 3 is a partial vertical sectional view of the cover of FIG. 2 taken along line 3—3 of FIG. 2;

FIG. 4 is a bottom plan view of the cover of FIGS. 2 and 3 looking into the interior portion thereof;

FIG. 5 is a side elevational view of one embodiment of the tire chain container apparatus with the cover removed from the container casing and the handles in an upright position;

FIG. 6 is a top plan view of the container casing of FIG. 5 with the handles positioned outwardly of the container casing;

FIG. 7 is an end elevational view of the casing of FIG. 6 with the handles moved to an outwardly extended position;

FIG. 8 is an exploded fragmentary side elevational view of a modified form of container apparatus in which the handle is removable from the container casing and showing a portion of the handle removed from the casing;

FIG. 9 is a fragmentary vertical sectional view of the container apparatus of FIG. 8 showing the removable handle connected thereto;

FIG. 10 is a top plan view of one end of the handle used with the modified form of container apparatus of FIG. 8;

FIG. 11 is a schematic side elevational view showing a vehicle wheel and a portion of a tire chain on the cover for initially fastening a tire chain to the vehicle wheel; and FIG. 12 is a schematic side elevational view, somewhat similar to FIG. 11, and showing the tire chain fastened to the vehicle wheel.

DETAILED DESCRIPTION OF PREFERRED EMBODIMENTS

Referring now in more detail and by reference characters to the drawings which illustrate a preferred embodiment of the invention, A designates a tire chain container apparatus comprised of a base or so-called container casing 10 often referred to as a container, and an upper cover 12. The cover 12 is provided as a lid for the container and is also adapted for use as a ramp to support a vehicle wheel thereon and thereby aid in the attachment of a tire chain to a tire on that vehicle wheel.

The tire chain container 10 is a box-like structure having an enclosing or continuous rectangularly shaped side wall 14 and a relatively flat rectangularly shaped bottom wall 16. The bottom wall 16 may be provided with a plurality of downwardly depending feet or pads 18 integrally formed therewith for engaging the ground or other supporting surface in order to support the casing 12 in an upright position.

The rectangularly shaped enclosing side wall 14 may be tapered slightly outwardly and upwardly, in the manner as more fully illustrated in FIGS. 5 and 7. At its upper end, the rectangularly shaped side wall 14 is provided with an integrally formed upstanding, rectangularly shaped rim 20. The rim 20 preferably is not inclined as is the enclosing side wall section 14 and is adapted to receive the cover 12 in enclosing cover-wise engagement therewith.

The side wall 14 includes a pair of opposed transverse side wall sections, often refered to as "end wall" sections 22 and 24. Located on one of the pair of spaced apart end wall sections 22 are a pair of transversely spaced apart mounting elements or so-called "bosses" 26 and 26'. Similarly mounted on the opposed transversely extending wall section 24 are a pair of outwardly projecting mounting elements or so-called "bosses" 28 and 28' corresponding to the mounting elements 26 and 26'.

A first handle member 30 is connected to the first pair of mounting elements 26 and 28 and a second handle element 32 is connected to the second pair of mounting elements 26' and 28' in the manner as illustrated in FIGS. 1, 5 and 6 of the drawings. The mounting elements 26, 28, and 26' and 28' also exist in the form of thin flat ribs which extend outwardly from the end wall sections 22 and 24 of the casing 10 and are integral therewith. The handle members 30 and 32 also have lower portions 34 and 36, respectively, on each of the lower ends thereof and which are integral with the upper ends of the mounting elements 26, 28 and 26', 28', respectively. The lower portions 34 and 36 may exist in the form of thin flat webs which integrally connect the handles to the upper ends of the mounting elements.

The lower portions or webs 34 and 36 are sufficiently thin so as to permit the handle elements to be hingedly mounted and swung outwardly, in the manner as illustrated in FIGS. 6 and 7, to a position where they are disposed outwardly of the side walls of the casing. They can also extend upwardly over the casing and the cover, in the manner as illustrated in FIGS. 1 and 5. Nevertheless, while these webs are relatively thin to permit the flexible movement of the handles, they are sufficiently strong so as to permit the handles to carry the weight of the entire container apparatus with chains stored therein.

The handles 30 and 32 are each integrally provided with grip portions 38 and 40 for engagement by the hands of a user. The grip portions 38 and 40 have relatively flat interiorly presented surfaces so they may be abutted against one another in flat engagement in the manner as illustrated in FIG. 1 of the drawings. Furthermore, the handles can extend above the cover 12, in the manner as illustrated, so as to retentively hold the cover onto the container casing 10 when the chains are stored therein and the apparatus is capable of being transported. While the handles do not necessarily have to engage the cover, they nevertheless prevent the cover from inadvertently being removed or displaced.

The container cover 12 is more fully illustrated in FIGS. 1–4 of the drawings and is comprised of a pair of spaced apart longitudinally extending side walls 50 and 52 which are connected at each of their ends by transversely extending vertical end strips 54 and 56. Integrally formed with the end strips 54 and 56 and with the longitudinally extending side walls 50 and 52 are upwardly inclined ramps 58 and 60 on the opposite sides of the cover 12 and which lead to a somewhat dished or concave upper surface 62.

The upper surface may not be truly arcuate and the dished upper surface 62 may be formed by a pair of spaced apart downwardly and inwardly converging wall portions, as shown thereby forming a depressed portion. Thus, the term "dished" upper surface or concave upper surface will be deemed to cover arcuate upper surfaces or discrete sections which are inclined to provide a dished effect. Each of the ramps 58 and 60 are provided with a plurality of transversely extending ridges 63 in order to form a non-skid upper surface and to enable a vehicle tire, designated by reference letter T in FIG. 10, to be driven onto the upper surface thereof. The dished upper surface 62 is provided with a transversely extending recess 64 in order to receive a portion of a tire chain designated by reference letter C in FIG. 10. This facilitates installing a tire chain around the bottom portion of the vehicle tire so as to be easily fastened to the vehicle wheel. In like manner, the tire chain can be unfastened from the vehicle wheel. When fastening or unfastening of the tire chain to the wheel has been completed, the vehicle wheel can be merely driven off of the cover along one of the ramps 58 or 60 thereof.

The transverse end strips 54 and 56 are each provided with pairs of outwardly projected tabs 65, respectively, which operate as detents to hold the handles in an upright position. For this purpose it can be observed that the tabs have angulated edges with inwardly presented drop-off shoulders. The handles would normally be biased outwardly in absence of these tabs 65. The tabs 65 are also adapted for engagement by the fingers of a user in order to enable the cover 12 to be easily removed from the container casing 10 or to be reinserted on the rim 20 of the container casing.

The side walls 50 and 52 of the cover 12 are each provided with a plurality of enlarged teeth 66 for the greater portion of their lower edges and which are adapted to engage the ground surface in order to provide a non-skid retaining means. In this way, when the cover is disposed on the ground surface, the teeth will engage the ground surface. When a vehicle wheel has started to be driven onto the cover, a downward force vector will be applied thereby creating a retentive holding action to prevent the cover from being pushed by the vehicle wheel in a direction of movement of the vehicle. The term ground surface is intended to mean the ground, whether or not covered with snow or ice or the like. Thus, for example, a snow covered surface is deemed to be a ground surface.

The cover 12 is also integrally provided with a plurality of struts or ribs (hereinafter described) to enable it to be molded and to be formed in a unitary operation. These ribs are provided in a selected number and location relative to the size of the cover to provide substantial strength to support the weight of a portion of a vehicle and nevertheless provide a light weight quality. Thus, the cover 12 can also be formed of any of the materials used in the formation of the container casing 10 and the entire cover can also be formed in the same operation, as for example, a molding operation, or the like.

The groove 64 is formed by vertically located transverse walls 86 which merge into a rectangularly shaped plate 88. These walls 86 and plate 88 provide added strength to the cover 12 in the region where a substantial amount of the weight of a vehicle carried by a vehicle wheel is imposed when such wheel is on the cover.

The container cover 12 is provided with a plurality of vertically disposed longitudinally extending ribs 80 (three as shown) and which extend from one end strip 54 and the ramp 58 to the transverse wall 86 nearest thereto. A similar set of three longitudinally extending ribs 80 extend from the opposite end strip 56 and opposite ramp 60, to the transverse wall nearest thereto as more fully illustrated in FIGS. 3 and 4. The two sets of ribs on each of the opposed sides of the flat wall 88 may be considered one set of three longitudinally extending ribs. The container cover 12 is also provided with a plurality of vertically disposed transversely extending ribs 82 (four as shown) and which extend between the longitudinally extending side walls 50 and 52, as also shown in FIG. 4.

Furthermore, these longitudinally extending ribs and the transversely extending ribs extend downwardly in a vertical direction for the greater portion of the overall depth of the container cover 12 in the region in which they are located. Thus, all of the ribs will extend downwardly from the interiorly presented surfaces of the ramps 58 and 60 and the upper surfaces 62 in the interior of the cover and they will all have their lower edges aligned in a common horizontal plane spaced slightly above the lower edge of the cover 12.

Vertically disposed somewhat circularly shaped columns 84 are formed in regions where the transversely extending ribs 82 and the longitudinally extending ribs 80 intersect, in the manner as illustrated in FIG. 4. These columns enable the cover 12 to accept a substantial amount of compressive loading.

FIGS. 8–10 illustrate a modified form of tire chain container apparatus B which is similarly comprised of a base or so-called container casing 90 very similar to the container casing 10 and an upper cover 92 which is substantially identical to the previously described upper cover 12. Consequently, the upper cover 92 will be neither illustrated nor described in any further detail herein.

The container apparatus B employs a handle which is removeable as opposed to being hingedly displaceable, as in the apparatus A. In this case, a pair of somewhat inverted U-shaped hook-elements 94 are formed on each of the opposite ends of the container casing 90, in the manner as illustrated. Further, the container cover 92 is provided on each of the opposite transverse ends with an outwardly extending lip 96 for purposes which will presently more fully appear.

Only one handle 97 is employed in the embodiment B as illustrated in FIGS. 8–10. The handle is provided at its lower or outer ends with a transversely extending strip 98 adapted to fit into and engage the undersurface of the U-shaped hook 94. A second strip 100 spaced upwardly (inwardly) from the strip 98 is adapted to fit over the lip 96, much in the manner as illustrated in FIG. 9 and thereby retentively hold the handle in an engaged position on the container casing and to also retentively hold the cover onto the casing. Due to the fact that the material is somewhat resilient, the upper strip 100 can be pushed off of the lip 96 permitting the lower strip 98 to be dropped sufficiently for removal from the inverted U-shaped hook 94.

FIGS. 11 and 12 more fully illustrate the use of the container cover for fastening a tire chain to a vehicle wheel. FIG. 11, for example, illustrates the arrangement for laying a chain on the ground surface and over a portion of the cover with the vehicle wheel initially driven onto the upper surface of the cover. FIG. 12 shows the tire chain completely fastened around the tire of the wheel.

In a preferred embodiment of the present invention, the container casing has an overall length, as measured along the bottom wall, of approximately ten inches in length by five and one-half inches in width. At its upper end the container casing has an overall length of approximately eleven and one-half inches by approximately seven and one-fourth inches. The cover similarly has an overall length of about twelve inches and a width of about seven and one-half inches. The dimension from the lower edge of the cover to the highest point of each of the ramps is approximately two and one-half inches and the upper surface between each of the upper ends of the ramps is approximately five and one-fourth inches. The overall longitudinal dimension of the groove is one and one-half inches.

In a preferred embodiment of the invention, the ribs have an overall thickness of about one-eighth of an inch. The side walls 50 and 52 are sufficiently thick so that they actually function as struts in the same manner as the ribs 80. Further, the end strips 54 and 56 are sufficiently thick, with about the same thickness as the side walls 50 and 52, so that the end strips 54 and 56 also function as transversely extending struts. The side walls 50 and 52 and ramps 58 and 60 and end strips 54 and 56 each preferably have a thickness about three-sixteenths of an inch.

The container casing 10 and the cover 12 may be molded from a suitable plastic material such as polyethylene, many of the polyvinyl compounds, such as polyvinyl chloride, etc. The casing and cover may also be formed of reinforced plastic composite materials, such as fiberglass-epoxy resin composites and the like. However, it is preferable to form the casing of moldable plastics due to the fact that the cost thereof is significantly less and the weight is substantially reduced, and the moldable plastics still provide the necessary rigidity and durability.

It can be observed, as a result of the construction of both the cover 12 and the casing 10 that each can be formed in molding operations. Further, essentially all portions of the casing and all portions of the cover can be formed of moldable plastic materials of the types mentioned above. As a result, the tire chain container apparatus is not only capable of being constructed at a low cost, but it is highly durable and further, it is capable of supporting the weight of a vehicle carried by the wheel on the cover portion when used as a ramp. The handles are adapted so as to retain the cover on the casing without the need of external fasteners and they are also sufficiently strong to carry the entire container.

Due to the fact that the container apparatus is formed of molded plastic materials, the container casing, for example, will retain any condensed water from the snow which may have been collected on the chains as they are removed from the tire of the vehicle and stored in the casing. This will prevent the water from soiling the lining or covering material in the trunk of the automotive vehicle. In addition, due to the fact that the container casings and covers are formed of a molded plastic material, they will not rust or deteriorate as a result of the collected water, and particularly salt entrained water.

Thus, there has been illustrated and described a tire chain container apparatus having a container casing to store chains and cover which serves as a ramp to support a vehicle wheel, and which therefore fulfills all of the objects and advantages sought thereby. It should be understood that many changes, modifications, variations and other uses and applications will become apparent to those skilled in the art after considering this specification and the accompanying drawings. Therefore, any and all such changes, modifications, variations and other uses and applications, which become apparent to those skilled in the art, after considering this specification and the accompanying drawings, are deemed to be covered by the invention which is limited only by the following claims.

Having thus described my invention, what I desire to claim and secure by Letters Patent is:

1. A tire chain container apparatus comprising:
   (a) a container casing formed of a plastic material and having an interior chamber sized to receive tire chains for the wheels of a vehicle and said container casing having an open end thereof,
   (b) a cover formed of a plastic material for said casing and adapted to be removably disposed on said container casing over the open end thereof, said cover having an upper wall capable of receiving a vehicle wheel with a tire and which cover is adapted to support the weight of the vehicle carried by that wheel and tire, a pair of opposed ramps on said cover on opposite sides thereof and leading to said upper wall, a pair of opposed side walls extending between and connecting said ramps and upper wall, said upper wall having a recess therein to receive a portion of a tire chain so that when a vehicle wheel is driven onto said upper wall, the portion of the chain in said recess can be fastened around a portion of the tire on the vehicle wheel, said cover having an interior region with a plurality of longitudinally extending ribs integral with said cover and extending from each of said ramps, and a plurality of transversely extending ribs integral with said cover and extending between each of said side walls to reinforce said cover to thereby enable it to support the portion of weight of a vehicle carried by a vehicle wheel and tire when on said upper wall, said recess on its underside also being reinforced with a strut forming wall extending at least around the periphery of the surface area of the recess.

2. The tire chain container apparatus of claim 1 further characterized in that said longitudinally extending ribs and transversely extending ribs form slightly enlarged vertical supporting columns at their intersections.

3. The tire chain container apparatus of claim 2 further characterized in that said cover is comprised of three interiorly located longitudinaly extending ribs and two interiorly located transversely extending ribs.

4. The tire chain container apparatus of claim 3 further characterized in that the lower ends of said ramps provide two additional transverse ribs and the lower ends of said walls provide two additional longitudinal ribs.

5. The tire chain container apparatus of claim 1 further characterized in that a plurality of teeth are provided on the lower edge of said cover and adapted to engage a ground surface and thereby retentively hold the cover in a fixed position on such ground surface when a vehicle wheel is driven onto or off of said cover.

6. The tire chain container apparatus of claim 1 further characterized in that said container casing is generally rectangular in shape and has a rectangularly shaped side wall and a bottom wall forming an open upper end, the width and length of said casing being sufficient to support said casing in an upright position when tire chains are stored therein.

7. A tire chain container apparatus comprising:
   (a) A container casing formed of plastic material and having an interior chamber sized to receive tire chains for the wheels of a vehicle, said container casing being rectangular in shape and having a rectangularly shaped side wall and a relatively flat bottom wall formng a generally rectangularly shaped open upper end, the width and length of said casing being sufficient to support said casing in an upright position when tire chains are stored therein,
   (b) a cover formed of a plastic material for said container casing and adapted to be removably disposed on said container casing over the generally rectangularly shaped open upper end thereof, said cover having an upper surface capable of receiving a vehicle wheel with a tire thereon and which wheel and tire is adapted to support the weight of a portion of the vehicle carried by that wheel and tire, said cover having a pair of upwardly inclined oppositely disposed ramps on opposite sides of said upper surface and leading to said upper surface, a pair of spaced apart side walls on said cover extending between said ramps and upper surface, and which ramps and side walls on the cover are located in a rectangular arrangement, said upper surface also having a recess therein to receive a portion of a tire chain so that when a vehicle wheel and tire is driven onto said upper surface, the portion of the chain in said recess can be fastened around the bottom portion of the tire on the vehicle wheel, and
   (c) cooperating means on said cover and bottom casing for releasably securing said cover to said bottom casing.

8. The tire chain container apparatus of claim 7 further characterized in that said cover has an interior region with a plurality of longitudinally extending ribs integral with said cover and a plurality of transversely extending ribs integral with said cover for stiffening and reinforcing said cover to enable said cover to support the portion of the weight of a vehicle carried by a vehicle wheel and tire when on said upper surface.

9. The tire chain container apparatus of claim 7 further characterized in that a plurality of teeth are located on the lower edge of said cover and adapted to engage the ground surface and thereby retentively hold the cover in a fixed position on such ground surface when a vehicle wheel is driven onto or off of said cover.

10. The tire chain container apparatus of claim 7 further characterized in that said apparatus comprises a pair of handles which are hingedly mounted on said casing and are capable of being hingedly shifted from a position outwardly of said cover where said cover can be removed to a position where they extend over said cover thereby maintaining said cover on said casing without need of a separate locking means.

11. The tire chain container apparatus of claim 7 further characterized in that said apparatus comprises a handle having locking means at the ends thereof, a pair of spaced apart cooperating locking elements on said casing side wall for releasably securing the locking means at the ends of said handle, said handle extending over said cover when the locking means of said handle are secured to the locking elements thereby maintaining said cover on said casing without need of a separate locking means, said locking means also being adapted to be released from the cooperating locking elements to permit removal of at least one side of the handle and permitting the cover to be removable from said casing.

12. The tire chain container apparatus of claim 7 further characterized in that said cover and said casing are formed of moldable plastic materials.

13. A tire chain container apparatus comprising:
(a) a bottom casing formed of plastic material and having a rectangularly shaped side wall comprised of four side wall sections and having an open end thereof forming an internal chamber sized to receive tire chains for the wheels of a vehicle,
(b) a cover formed of a plastic material for said casing and adapted to be removably disposed on said bottom casing over the open end thereof, said cover having an upper surface capable of receiving a vehicle wheel and tire and which cover is adapted to support the weight of the vehicle carried by that wheel and tire, a pair of oppositely disposed upwardly inclined ramps on each of the opposite sides of said cover leading to said upper surface, said upper surface having a recess therein to receive a portion of a tire chain so that when a vehicle wheel and tire is driven onto said upper surface, the portion of the tire chain in said recess can be fastened around a portion of the tire on the vehicle wheel,
(c) at least one first outwardly projecting mounting element on a first of said side wall sections and at least one second outwardly projecting mounting element on a second of said side wall sections which is spaced apart from and generally parallel to the first named side wall section, and
(d) a handle member connected to and extending between the mounting element on said first of said side wall sections and the aligned second mounting element on the spaced apart side wall section, said handle member being adapted to be disposed over and engaging portions of the cover thereby maintaining the cover on the casing and thereby avoiding the need of additional locking elements to maintain the cover on the casing, said handle member also being adapted to be displaced relative to said cover permitting the cover to be removed from the casing.

14. The tire chain container apparatus of claim 13 further characterized in that said mounting elements are integral with said casing.

15. The tire chain container apparatus of claim 13 further characterized in that said handle members are formed of a plastic material similar to that used in the formation of said cover and casing.

16. The tire chain container apparatus of claim 15 further characterized in that said handle member extends over said ramps when not displaced.

17. The tire chain container apparatus of claim 13 further characterized in that:
(a) said casing is provided with a pair of said outwardly projecting mounting elements on a first of said side wall sections and a pair of said outwardly projecting mounting elements on a second of said side wall sections spaced apart and generally parallel to the first named side wall section, and
(b) a first handle member is connected to and extends between one of the mounting elements on a first of said side wall sections and an aligned one of the mounting elements on the spaced apart second side wall section, and a second handle member is connected to and extends from the other of the mounting elements on said first of said side wall sections and an aligned one of the mounting elements on the spaced apart second side wall section, each of said handle members having a hinge section in proximity to each of the mounting elements to which the handle member is connected and each hinge section being formed by a region of reduced thickness, said hinge sections permitting the handle members to be moved from a position where they are disposed outwardly of said cover permitting the cover to be removed from the casing to a position where the handle members are disposed over the cover thereby maintaining the casing on the cover and thereby avoiding the need of a separate locking means to maintain the cover on the casing.

18. The tire chain container apparatus of claim 13 further characterized in that:
(a) said mounting elements are outwardly projecting hook-like mounting elements and at least one first outwardly projecting hook-like mounting element is on a first of said side wall sections and at least one second outwardly projecting hook-like mounting element is on a second of said side wall sections which is spaced apart from and generally parallel to the first named side wall section,
(b) a first lip on said first side wall section and a second lip on said second side wall section, and
(c) a handle member removably connected to and extending between the first mounting element on said first of said side wall sections and the aligned second mounting element on the spaced apart second side wall section, said handle member having a pair of lower ends, a first section on each of the lower ends for fitting into the mounting elements on each of said side wall sections and a second section adapted to engage the lip on each of the spaced apart wall sections, each of said lower ends of said handle member having an aperture in proximity to each of the mounting elements to receive said mounting elements and which also permits the handle elements to be removed thereby permitting the cover to be removed from the casing, and where the handle members can be disposed over the cover when secured to the casing thereby maintaining the cover on the casing and thereby avoiding the need for a separate locking means to maintain the cover on the casing.

19. The tire chain container apparatus of claim 13 further characterized in that said cover has an interior region with a plurality of longitudinally extending ribs integral with said cover and a plurality of transversely extending ribs integral with said cover to reinforce said cover to enable it to support the portion of the weight of a vehicle carried by a vehicle wheel and tire on said upper surface.

20. The tire chain container apparatus of claim 19 further characterized in that a plurality of teeth are located on the lower edge of said cover and adapted to engage the ground surface and thereby retentively hold the cover in a fixed position on such ground surface when a vehicle wheel is driven onto or off of said cover.

21. A tire chain container apparatus comprising:
(a) a container casing formed of plastic material and having an interior chamber sized to receive tire chains for the wheels of a vehicle, said container casing being rectangular in shape and having a rectangularly shaped side wall and a relatively flat bottom wall forming a generally rectangularly shaped open upper end, the width and length of said casing being sufficient to support said casing in an upright position when tire chains are stored therein,
(b) a generally rectangularly shaped cover formed of a plastic material for said casing and adapted to be removably disposed over the open end of said container casing, said cover having an upper wall with an upper surface capable of receiving a vehicle wheel with a tire thereon and which cover is adapted to support that portion of the weight of the vehicle carried by that wheel and tire, a pair of opposed ramps on said cover leading to said upper surface and a pair of opposed side walls extending between and connecting said ramps and upper wall, said upper surface having a recess therein to receive a portion of a tire chain so that when a vehicle wheel and tire is driven onto said upper surface, the portion of the chain in said recess can be fastened around a bottom portion of the tire on the vehicle wheel, said cover having an interior region with a plurality of longitudinally extending ribs integral with said cover and extending from each of said ramps, and a plurality of transversely extending ribs integral with said cover and extending between each of said side walls to reinforce said cover to thereby enable it to support the portion of the weight of a vehicle carried by that vehicle wheel and tire when on said upper surface, said recess having a flat surface on its underside,
(c) at least one first outwardly projecting mounting element on a first of said side wall sections and at least one second outwardly projecting mounting element on a second of said side wall sections which is spaced apart from and generally parallel to the first named side wall section, and
(d) A handle member connected to and extending between the mounting elements on said first of said side wall sections and the aligned second mounting element on the spaced apart second side wall section, said handle member being adapted to be disposed over and engaging portions of the cover thereby maintaining the cover on the casing and thereby avoiding the need for additional locking elements to maintain the cover on the casing, said handle member also adapted to be displaced relative to said cover permitting the cover to be removed from the casing.

22. The tire chain container apparatus of claim 21 further characterized in that said longitudinally extending ribs and transversely extending ribs form slightly enlarged vertical supporting columns at their intersections.

23. The tire chain container apparatus of claim 22 further characterized in that said cover is comprised of three interiorly located longitudinal ribs and two interiorly located transverse ribs.

24. The tire chain container apparatus of claim 23 further characterized in that the lower ends of said ramps provide two additional transverse ribs and the lower ends of said walls provide two additional longitudinal ribs.

25. The tire chain container apparatus of claim 24 further characterized in that a plurality of teeth are on the lower edge of said cover and adapted to engage the ground surface and thereby retentively hold the cover in a fixed position on such ground surface when a vehicle wheel is driven onto or off of said cover.

26. The tire chain container apparatus of claim 25 further characterized in that said handle member is formed of a plastic material similar to that used in the formation of said cover and casing.

27. The tire chain container apparatus of claim 21 further comprises:
(a) said rectangularly shaped side wall of said casing being comprised of a plurality of side wall sections, said casing is provided with a pair of said outwardly projecting mounting elements on a first of said side wall sections and a pair of said outwardly projecting mounting elements on a second of said side wall sections spaced apart and generally parallel to the first named side wall section, and
(b) a first handle member is connected to and extends between one of the mounting elements on a first of said side wall sections and an aligned one of the mounting elements on the spaced apart second side wall section, and a second handle member is connected to and extends from the other of the mounting elements on said first of said side wall sections and an aligned one of the mounting elements on the spaced apart second side wall section, each of said handle members having a hinge section in proximity to each of the mounting elements to which the handle member is connected and each hinge section being formed by a region of reduced thickness, said hinge sections permitting the handle members to be moved from a position where they are disposed outwardly of said cover permitting the cover to be removed from the casing to a position where the handle members are disposed over the cover thereby maintaining the cover on the casing and thereby avoiding the need of a separate locking means to maintain the cover on the casing.

28. The tire chain container apparatus of claim 21 further comprises:
(a) said mounting elements are outwardly projecting hook-like elements and at least one first outwardly projecting hook-like mounting element is on a first of said side wall sections and at least one second outwardly projecting hook-like mounting element is on a second of said side wall sections which is spaced apart from and generally parallel to the first named side wall section, (b) a first lip on said first side wall section and a second lip on said second side wall section, (c) a handle member removably connected to and extending between the first mounting element on said first of said side wall sections and the aligned second mounting element on the spaced apart second side wall section, said handle member having a pair of lower ends, a first section on each of the lower ends for fitting into the mounting elements on each of said side wall sections and a second section adapted to engage the lip on each of the spaced apart wall sections, each of said lower ends of said handle member having an aperture in proximity to each of the mounting elements to receive said mounting elements, and which also permits the handle element to be disengaged thereby permitting the cover to be removed from the casing, and where the handle member can be disposed over the cover when secured to the casing thereby maintaining the cover on the casing and thereby avoiding the need for a separate locking means to maintain the cover on the casing.

29. A plastic ramp device for use in the application and fastening of a snow chain to a wheel and tire of a vehicle, said ramp device comprising:

(a) an upper wall capable of receiving a vehicle wheel with a tire, (b) a pair of opposed inclined ramp walls on opposite sides of and leading to said upper wall, (c) a pair of opposed side walls extending between and connecting said ramp walls and upper wall, (d) an enlarged recess in said upper wall and extending between said pair of opposed side walls to receive a portion of a tire chain so that when a vehicle wheel is driven onto said upper wall the portion of the chain in said recess can be fastened around a portion of the tire on the vehicle wheel, (e) a plurality of longitudinally extending ribs integral with said upper wall and said ramps and extending from each of said ramps, (f) a plurality of transversely extending ribs integral with said side walls and said upper wall and extending between each of said side walls to reinforce said ramp device to thereby enable it to support the portion of weight of a vehicle carried by a vehicle wheel and tire when on said upper wall, said transversely extending ribs also being integrally connected to each of the longitudinally extending ribs at each of the intersections thereof, and (g) a strut-forming wall extending at least around the periphery of the surface area of the recess on its underside for further reinforcing.

30. The ramp device of claim 29 further characterized in that enlarged integrally formed vertical supporting columns exist at each of the intersections of said longitudinally extending ribs and transversely extending ribs.

31. The ramp device of claim 30 further characterized in that said ramp device is comprised of three interiorly located longitudinally extending ribs and two interiorly located transversely extending ribs.

32. The ramp device of claim 31 further characterized in that the lower ends of said ramp walls provide two additional transverse ribs and the lower ends of said side walls provide two additional longitudinal ribs.

33. The ramp device of claim 29 further characterized in that a plurality of teeth are provided on the lower edge of said device and adapted to engage a ground surface and thereby retentively hold the device in a fixed position on such ground surface when a vehicle wheel is driven onto or off of said device.

34. A tire chain container apparatus comprising:

(a) a container casing formed of plastic material and having an interior chamber sized to receive tire chains for the wheels of a vehicle, said container casing being rectangular in shape and having a rectangularly shaped side wall and a relatively flat bottom wall forming a generally rectangularly shaped open upper end, said side wall being comprised of a first side wall section and a spaced apart second side wall section, the width and length of said casing being sufficient to support said casing in an upright position when tire chains are stored therein, (b) a generally rectangularly shaped cover formed of a plastic material for said casing and adapted to be removably disposed over the open end of said container casing, said cover comprising:

(1) an upper wall capable of receiving a vehicle wheel with a tire, (2) a pair of opposed inclined ramp walls on opposite sides of and leading to said upper wall, (3) a pair of opposed side walls extending between and connecting said ramp walls and upper wall, (4) an enlarged recess in said upper wall and extending between said pair of opposed side walls to receive a portion of a tire chain so that when a vehicle wheel is driven onto said upper wall the portion of the chain in said recess can be fastened around a portion of the tire on the vehicle wheel, (5) a plurality of longitudinally extending ribs integral with said upper wall and said ramps and extending from each of said ramps, (6) a plurality of transversely extending ribs integral with said side walls and said upper wall and extending between each of said side walls to reinforce said ramp device to thereby enable it to support the portion of weight of a vehicle carried by a vehicle wheel and tire when on said upper wall, said transversely extending ribs also being integrally connected to each of the longitudinally extending ribs at each of the intersections thereof, and (7) a strut-forming wall extending at least around the periphery of the surface area of the recess on its underside for further reinforcing, (c) at least one first outwardly projecting mounting element on a first of said side wall sections and at least one second outwardly projecting mounting element on a second of said side wall sections which is spaced apart from and generally parallel to the first named side wall section, and (d) a handle member connected to and extending between the mounting elements on said first of said side wall sections and the aligned second mounting element on the spaced apart second side wall section, said handle member being adapted to be disposed over and engaging portions of the cover thereby maintaining the cover on the casing and thereby avoiding the need for additional locking elements to maintain the cover on the casing, said handle member also adapted to be displaced relative to said cover permitting the cover to be removed from the casing.

35. The tire chain container apparatus of claim 34 further characterized in that enlarged integrally formed vertical supporting columns exist at each of the intersections of said longitudinally extending ribs and transversely extending ribs.

36. The tire chain container apparatus of claim 35 further characterized in that said ramp device is comprised of three interiorly located longitudinally extending ribs and two interiorly located transversely extending ribs.

37. The tire chain container apparatus of claim 36 further characterized in that the lower ends of said ramp walls provide two additional transverse ribs and the lower ends of said side walls provide two additional longitudinal ribs.

* * * * *